United States Patent Office

3,503,884
Patented Mar. 31, 1970

3,503,884
SCOURING CLEANSER COMPOSITION
William Chirash, New Providence, and Robert Henry Trimmer, Edison, N.J., assignors to Colgate-Palmolive Company, New York, N.Y., a corporation of Delaware
No Drawing. Filed May 18, 1966, Ser. No. 550,906
Int. Cl. C11d 7/54; D06l 3/00
U.S. Cl. 252—95                                  6 Claims

ABSTRACT OF THE DISCLOSURE

An abrasive, scouring cleanser consisting essentially of a water-insoluble, inorganic, siliceous, abrasive material, chlorinated trisodium phosphate, inorganic detergent compound, a water-soluble bromide salt and a buffering agent in amounts sufficient to impart to the composition, in aqueous media, a pH within the range of from about 8.5 to about 10.5.

---

This invention relates to abrasive scouring cleanser compositions. More particularly, it relates to scouring cleansers containing chlorinated trisodium phosphate as an oxidizing agent.

In accordance with the present invention an improved abrasive scouring cleanser composition comprises at least about 60% by weight of a water-insoluble inorganic siliceous abrasive material having a particle size (diameter) of less than about 0.5 mm., about 0.5 to 20% by weight of chlorinated trisodium phosphate, about 0.5 to 15% by weight of a water-soluble organic detergent compound substantially stable in the presence of said chlorinated trisodium phosphate, about 0.3 to 10% by weight of a water-soluble bromide salt, and a material which adjusts the pH of said composition in aqueous media to within the range of from about 8.5 to about 10.5.

The instant compositions exhibit an accelerated rate of oxidation and bleaching on use with aqueous media by virtue of the combined action of the bromide salt and adjusted pH. Thus, these compositions exhibit improved effectiveness, especially with respect to speed and extent of stain and soil removal. These compositions are stable during storage also characterized by highly satisfactorily odor characteristics on use. They are also highly effective in polishing tarnished metal surfaces and in removal of smears or deposits of soft materials such as aluminum on porcelain surfaces.

The abrasive agents of the scouring cleansers of the present invention are well known in the art and include siliceous materials such as silica, feldspar, pumice, vulcanic ash, diatomaceous earth, bentonite, and talc, and mixtures thereof. For general use, it is preferred to use either silica or feldspar of various degrees of fineness for they are relatively hard and result in a whiter product. The abrasives may vary in hardness, particle size, and shape, and the choice for a particular composition is generally dependent upon the contemplated field of application. The particle size of the abrasive is less than 0.5 mm., and in general, the maximum particle size of substantially all of the abrasive is about 0.15 mm. Normally the abrasive employed will have a particle size such that at least about 85% and preferably 99% by weight thereof passes through a sieve having 0.074 mm. openings. On the other hand, in the interest of effective cleansing action it is appropriate for at least about 8% by weight of the abrasive particles to have a diameter of about 0.037 mm. or larger. The abrasive is present in a proportion of at least about 60%, and preferably at least about 85 to 95% by weight of the cleanser.

Chlorinated trisodium phosphate is a known material of commerce and may be produced by combining trisodium phosphate in its normal $Na_3PO_4 \cdot 12H_2O$ form and an alkali metal hypochlorite (such as sodium hypochlorite) in accordance with known procedures such as those set forth in Mathias U.S. Pat. No. 1,555,474 and the Adler U.S. Pat. No. 1,965,304. A typical commercial material may contain about 3.5% available chlorine, and it has been proposed that chlorinated trisodium phosphate be characterized as $4(Na_3PO_4 \cdot 11H_2O)NaOCl$.

The third essential ingredient of the present novel abrasive cleansers is a water soluble organic detergent which is stable in the presence of the contemplated chlorinated trisodium phosphate component. These organic detergents may be anionic, cationic, amphoteric or non-ionic in character, provided that they are compatible with the compositions as a whole in the proportions employed. Where they are liquids under normal conditions, such as the non-ionic agents generally, they may be prepared in particulate solid form after adsorption upon diatomaceous earth or other similar agents in procedures well known in the art.

As examples of suitable anionic detersive compounds contemplated within the ambit of the invention are the soaps and the sulfated and sulfonated synthetic detergents, especially those anionic detergents having about 8 to about 26 and preferably about 12 to about 22 carbon atoms to the molecule. The soaps are generally the water soluble salts of saturated higher fatty acids and mixtures thereof.

The sulfated and sulfonated detersive compounds are also well known in the art and may be prepared from suitable organic materials which are applicable to sulfonation ("true sulfonation and/or sulfation"). Of the vast variety of sulfates and sulfonates suitable, it is preferred to use the aliphatic sulfates and sulfonates of about 8 to 22 carbon atoms and the alkyl aromatic sulfonates.

The alkyl aromatic sulfonate detergents referred to may be mononuclear or polynuclear in structure. More particularly, the aromatic nucleus may be derived from benzene, toluene, xylene, phenol, cresols, phenol ethers, naphthalene, derivatives of phenanthrene nuclei, etc. It has also been found that the alkyl group may vary similarly. Thus, for example, the alkyl groups may be straight or branch chained and may consist of such radicals as dodecyl, pentadecyl, octyl, nonyl, decyl, keryl, mixed alkyls derived from fatty materials, cracked paraffin wax olefins, and polymers of lower mono olefins, etc. While the number of sulfonic acid groups present on the nucleus may vary, it is usual to have only one such group present in order to preserve as much as possible a balance between hydrophilic and hydrophobic portions of the molecule.

More specific examples of suitable alkyl aromatic sulfonate detergents are the propylated naphthalene sulfonates, the mixed butyl naphthalene sulfonates, tetrahydronaphthalene sulfonates, the various butylated diphenyl sulfonates and phenylphenol sulfonates. It is preferred, however, to use the higher alkyl aromatic sulfonates rather than the lower alkyl substituted detergents. Typical examples of this preferred class are the sulfonated and alkylated benzene type compounds wherein the alkyl group is at least 8 and preferably about 10 to about 16 carbon atoms. The benzene ring may possess other substituents including alkyl and hydroxy groups.

Other suitable agents are the surface-active sulfated or sulfonated aliphatic compounds, preferably having 8–22 carbon atoms. Within the scope of such definition are the sulfuric acid esters of polyhydric alcohols incompletely esterified with higher fatty acids, e.g., coconut oil monoglyceride monosulfate, tallow diglyceride monosulfate; the long chain pure or mixed alkyl sulfates, e.g., lauryl sulfate, cetyl sulfate; the hydroxy sulfonated higher fatty acid esters, e.g., higher fatty acid esters of low molecular weight alkylol sulfonic acids, e.g., fatty acid esters of isethionic acid; the fatty acid ethanolamide sulfates; the fatty acid amides of amino alkyl sulfonic acids, e.g., lauric amide of taurine, and the like. More particularly, it is preferred to use the sulfated aliphatic compounds containing at least about 8 carbon atoms, especially those having 12 to about 22 carbon atoms to the molecule.

Although the anionic detergents are preferred, cationic, non-ionic and amphoteric detergents may be also employed in whole or as part of the detergent component, provided they are compatible with the other elements of the composition under conditions of storage and use thereof. As cationic detergents there may be noted the long chain alkyl quaternary ammonium compounds, e.g., cetyl quaternary ammonium salts. Within this group are included cetyl tri-methyl ammonium chloride and cetyl pyridinium chloride. Another equivalent cationic agent is the diethylene amino ethyl oleyl amide product.

The non-ionic agents are also well known in the art including the polyoxyethylene ethers of alkyl aromatic hydroxy bodies (e.g., the alkylated polyoxyethylene phenols), the polyoxyethylene ethers of long chain aliphatic alcohols, the polyoxyethylene ethers of hydrophobic propylene oxide polymers, and higher alkyl amine oxides such as lauryl dimethyl amine oxide. Amphoteric detergents which also are contemplated, examples thereof including the salts of higher alkyl beta amino propionic acids, e.g., sodium N-lauryl beta alanine; the higher alkyl substituted betaines such as lauryl dimethylammonium acetic acid; and the imidazoline type exemplified by the disodium salt of 1-(2-hydroxyethyl)-1-(carboxymethyl)-2-(hendecyl)-4,5 dihydroimidazolinium hydroxide.

The anionic and cationic surface active agents are commonly used in the form of their water soluble salts. For the synthetic anionic compounds, the alkali metal (e.g. sodium, potassium) salts are preferred, though other salts such as ammonium amine, alkylolamine, and alkaline earth metals (e.g. calcium, magnesium) salts may be used if desired. For the cationic agents the chloride, sulfate, acetate, and like salts may be employed satisfactorily.

The amount of organic detergent to be used in the present compositions is from about 0.5% up to about 15% by weight, and preferably from about 1% to about 5% Commercial detergent compositions in which these organic detergents are the active ingredients and are compounded with other materials including sodium sulfate, the various phosphates, etc. may be employed with satisfactory results.

The bromide salt of the instant compositions is a solid, water soluble bromide which preferably is of substantially neutral or slightly alkaline nature, providing a ready source of bromide ions on dissolution in water. It is preferred to employ alkali metal bromides such as sodium bromide, sodium bromide dihydrate, lithium bromide, and potassium bromide, although alkaline earth metal bromides such as strontium bromide and magnesium bromide may also be employed in those instances in which these water hardness-producing cations are not objectionable. The preferred bromides are anhydrous, although any suitable combination in which the hypochlorite-liberating component and bromide salt do not yield water of hydration to each other may be employed, thereby insuring that the hypochlorite component maintains its original degree of hydration and stability in the composition. Preferably the bromide is employed in an amount which is equal to or somewhat greater than the molar equivalent of latent hypochlorite-chlorine which is present in the product, e.g., the mole ratio of water soluble bromide bromine to latent hypochlorite chlorine is preferably on the order of about 1:1 to about 1.5:1, and suitably in a proportion of about 0.1% to 10% by weight of the product.

Chlorinated trisodium phosphate is strongly alkaline in nature and, in the absence of modifying agents, an abrasive scouring cleanser formulated therewith characteristically exhibits a pH above 11.5. As set forth hereinabove, however, it has been found that the instant compositions exhibit maximum activity at an appreciably lower pH, and therefore the instant compositions are adjusted to exhibit a pH (in a 50% aqueous slurry) within the range of 8.5 to 10.5. Preferably this is achieved by including in these compositions a water-soluble inorganic buffer salt of such a nature and in such quantity as to adjust the pH of the composition to the desired range. Examples of such salts include the water-soluble inorganic alkali metal bicarbonates, such as sodium bicarbonate, acid phosphates, borates and the like such as monosodium, dihydrogen orthophosphate, disodium monohydrogen orthophosphate, and borax. Typically these buffering agents are employed in a small but effective amount sufficient to adjust the pH of a 50% slurry of the final composition to the desired range, as exemplified by from about 1 to 15% by weight thereof, and preferably about 2 to 7% by weight thereof.

Suitable various adjuvant materials may also be used in the instant abrasive detersive compositions. These additives may be inorganic or organic in structure and may be including in compositions of the present invention. Inorganic water soluble builder salts may be added in any suitable amounts, usually up to about 25% and preferably up to about 15%. Similarly, there may be employed minor amounts of sequestering agents such as nitrilotriacetic acid, ethylene diamine tetraacetic acid, diethylene triamine pentaacetic acid, and their salts (e.g. sodium salts), wood pulp, sawdust, magnesite, whiting, sodium carboxymethylcellulose, anti-caking agents, optical brighteners, and the like. These constituents, as well as all of the other constituents of the instant cleansers, desirably are of the same fine particle size as the abrasive constituent, and suitably may be ground in an attrition mill if necessary in order to insure the preparation of a uniform product of smooth appearance.

The following examples are illustrative of the present invention and it will be understood that the invention is not limited thereto. All of the solid constituents employed in the compositions of these examples have a maximum particle diameter of less than 0.5 mm., and at least 8% by weight of the abrasive, e.g. silica and feldspar, particles have a diameter in the range of 0.037-0.15 mm. In addition the chlorinated trisodium phosphate used is of commercial grade and contains 3.5% available chlorine. In these examples, and elsewhere throughout the specification and claims all percentages and ratios are by weight unless otherwise specified.

EXAMPLE I

An abrasive scouring cleanser composition is prepared by dry mixing:

| | Parts by weight |
|---|---|
| Silica (at least 99% by weight passes through a wire sieve in which the openings between the wires are 0.074 mm.) | 85.2 |
| Chlorinated trisodium phosphate | 7.5 |
| Sodium bromide | 0.5 |
| Sodium bicarbonate | 2.0 |
| Sodium dodecyl benzene sulfonate | 3.0 |
| Sodium sulfate | 1.3 |
| Sodium silicate | 0.5 |

This composition is characterized by a pH in 50% aqueous slurry of 10.0.

EXAMPLE II

| | |
|---|---|
| Silica of Example I | 79.2 |
| Chlorinated trisodium phosphate | 7.5 |
| Sodium bromide | 0.5 |
| Sodium bicarbonate | 8.0 |
| Sodium dodecyl benzene sulfonate | 3.0 |
| Sodium sulfate | 1.3 |
| Sodium silicate | 0.5 |

This composition exhibits a pH of about 8.8.

EXAMPLE III

| | |
|---|---|
| Silica of Example I | 86.05 |
| Sodium dodecyl benzene sulfonate | 3.0 |
| Sodium sulfate | 0.45 |
| Sodium silicate | 0.45 |
| Chlorinated trisodium phosphate | 7.5 |
| Sodium bromide dihydrate | 1.0 |
| Monosodium dihydrogen orthophosphate | 2.0 |

This composition is characterized by a pH in 50% aqueous slurry (1%) of 10.4.

EXAMPLE IV

| | Parts by weight |
|---|---|
| Silica of Example I | 81.3 |
| Sodium dodecyl benzene sulfonate | 3.0 |
| Sodium sulfate | 0.45 |
| Sodium silicate | 0.45 |
| Chlorinated trisodium phosphate | 7.5 |
| Borax | 6.8 |
| Sodium bromide | 0.5 |

The pH of this composition in 50% aqueous slurry is 10.0.

EXAMPLE V

| | |
|---|---|
| Silica of Example I | 66.6 |
| Sodium dodecyl benzene sulfonate | 3.0 |
| Sodium sulfate | 0.45 |
| Sodium silicate | 0.45 |
| Chlorinated trisodium phosphate | 7.5 |
| Disodium monohydrogen orthophosphate dodecahydrate | 21.5 |
| Sodium bromide | 0.5 |

The pH of this product in 50% aqueous slurry is 10.5.

EXAMPLE VI

| | |
|---|---|
| Feldspar | 84.1 |
| Sodium dodecyl benzene sulfonate | 3.0 |
| Sodium sulfate | 0.45 |
| Sodium silicate | 0.45 |
| Chlorinated trisodium phosphate | 7.5 |
| Sodium bicarbonate | 4.0 |
| Sodium bromide | 0.5 |

This composition exhibits a pH in 50% aqueous slurry of 9.0.

What is claimed is:

1. An abrasive scouring cleanser composition consisting essentially of at least about 60% by weight of a water-insoluble, inorganic, siliceous abrasive material having a particle size of less than about 0.5 mm., about 0.5 to 20% by weight of chlorinated trisodium phosphate, about 0.5 to 15% by weight of a water-soluble organic detergent compound substantially stable in the presence of said chlorinated trisodium phosphate, about 0.3 to 10% by weight of a water-soluble bromide salt, and a water-soluble inorganic buffering agent which adjusts the pH of said composition in aqueous media to within the range of from about 8.5 to about 10.5.

2. An abrasive scouring cleanser composition as set forth in claim 1 wherein said inorganic siliceous abrasive material is silica having a particle size of less than about 0.15 mm. and such that at least 85% by weight thereof passes through a sieve having 0.074 mm. openings, wherein said water-soluble organic detergent compound is sodium dodecyl benzene sulfonate, said water-soluble bromide salt is sodium bromide and said buffering agent is sodium bicarbonate, the latter being present in amounts ranging from about 1 to 15% by weight of composition.

3. An abrasive scouring cleanser as set forth in claim 1 which contains at least 85% by weight of silica as the inorganic siliceous abrasive material.

4. An abrasive scouring cleanser as set forth in claim 1 in which the water-soluble bromide salt is an alkali metal bromide.

5. An abrasive scouring cleanser as set forth in claim 1 in which the water-soluble inorganic buffer salt is sodium bicarbonate.

6. An abrasive scouring cleanser as set forth in claim 4 in which the alkali metal bromide is sodium bromide.

References Cited

UNITED STATES PATENTS

| 2,815,311 | 12/1957 | Ellis et al. | 252—186 XR |
|---|---|---|---|
| 3,359,207 | 12/1967 | Kamko et al. | 252—99 |

FOREIGN PATENTS

| 208,587 | 6/1957 | Australia. |
|---|---|---|
| 832,105 | 4/1960 | Great Britain. |

MAYER WEINBLATT, Primary Examiner

U.S. Cl. X.R.

8—108; 252—99, 187